April 27, 1937.  C. O. STENMARK  2,078,741
HOLDER
Filed Jan. 8, 1936  3 Sheets-Sheet 1

INVENTOR
Carl O. Stenmark
BY
Howard P. King
ATTORNEY

April 27, 1937.　　　C. O. STENMARK　　　2,078,741
HOLDER
Filed Jan. 8, 1936　　　3 Sheets-Sheet 2
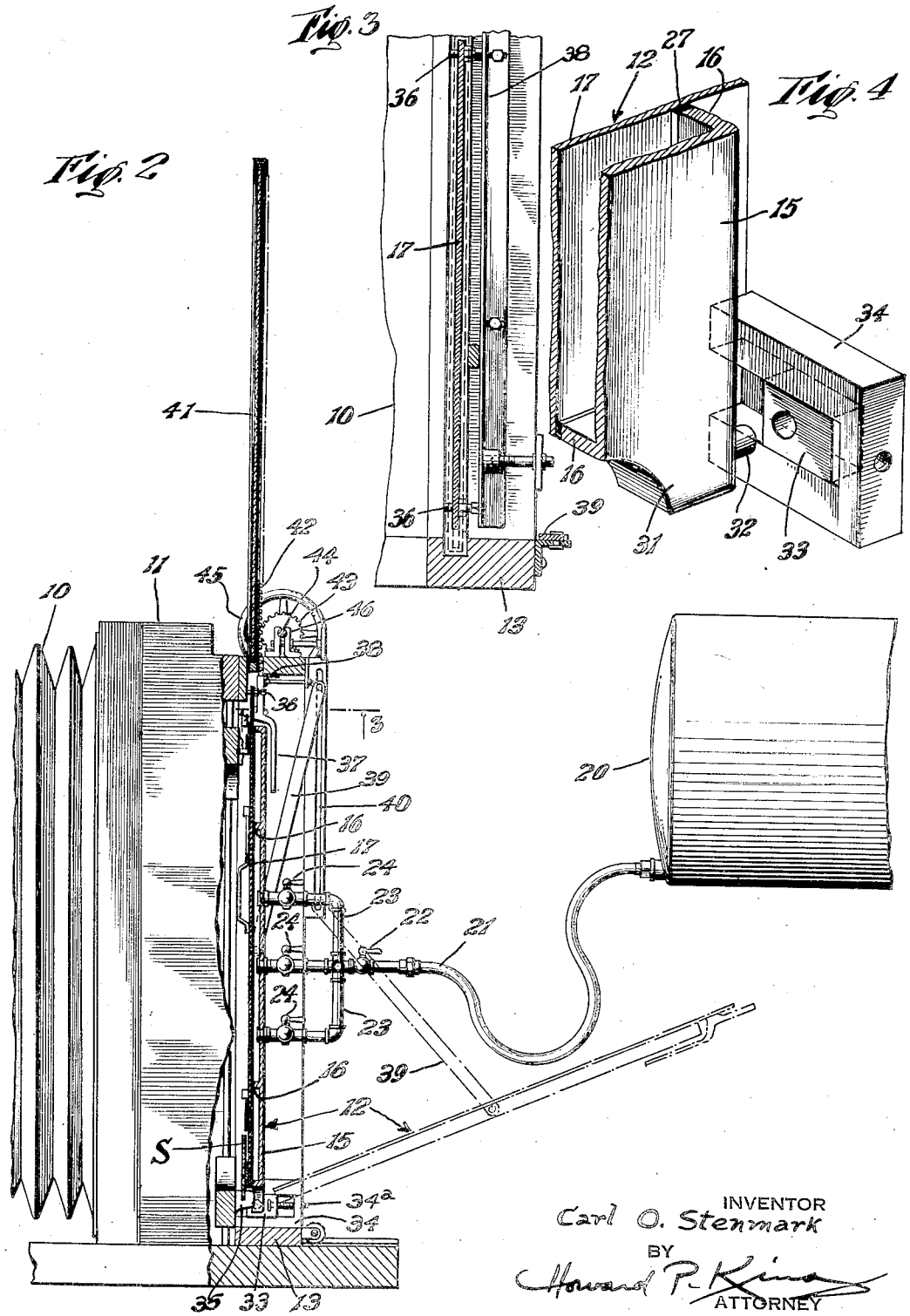

April 27, 1937.  C. O. STENMARK  2,078,741
HOLDER
Filed Jan. 8, 1936  3 Sheets-Sheet 3
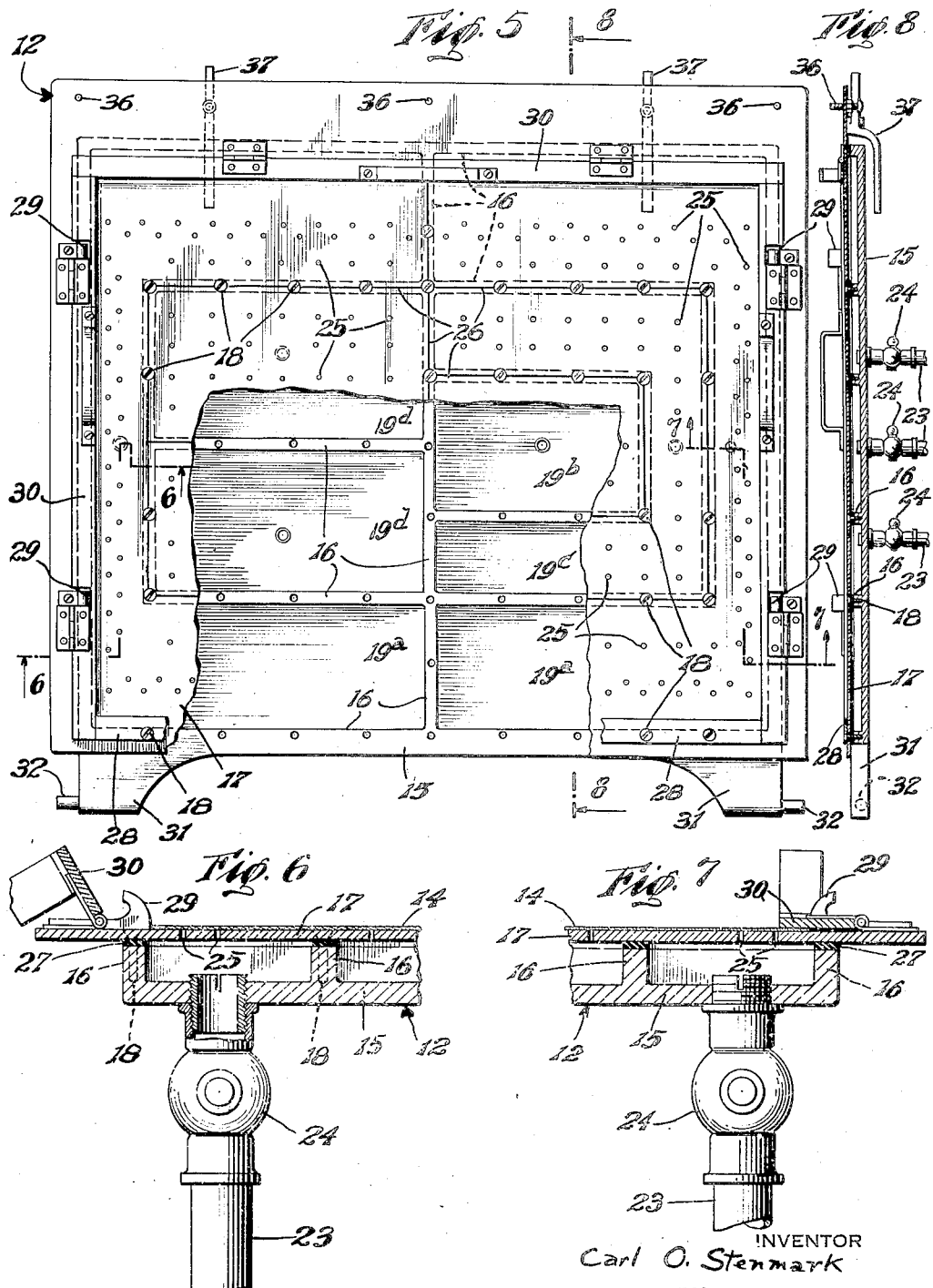
INVENTOR
Carl O. Stenmark
BY
Howard P. King
ATTORNEY Patented Apr. 27, 1937

2,078,741

UNITED STATES PATENT OFFICE 2,078,741

HOLDER

Carl O. Stenmark, Brooklyn, N. Y.

Application January 8, 1936, Serial No. 58,145

5 Claims. (Cl. 95—66)

This invention relates to holders, and more particularly to vacuum holders for photographic films and the like.

The objects of the invention are to provide a holder which may replace present-day film holders in cameras upon the market; to enable a single holder to properly retain various sizes of films; to provide for focusing the camera and ready substitution of the holder for the focusing glass with the firm brought to the exact plane previously occupied by the focusing glass; to retain the holder upon the camera at all times; to keep the film flat throughout; to permit rapid placement and replacement of films; to provide appropriate adjustments and control mechanisms; to secure lightness, solidity and simplicity of construction, simple, easy, and precise operation; and to secure other advantages and results as may be brought out in the following description.

Referring to the accompanying drawings, in which like numerals of reference indicate similar parts throughout the several views:

Figure 2 is a side elevation of the rear portion of a camera with my improved holder mounted and in closed position and in section on line 2—2 of Fig. 1;

Figure 3 is a sectional view, looking upward toward the top rail of the holder frame, as upon line 3—3 of Fig. 2;

Figure 4 is a perspective view of the adjustable hinge mounting for the body portion of the holder;

Figure 5 is a front view of the holder, partly broken away to show interior construction;

Figure 6 is a detail section at one edge of the holder body portion as upon line 6—6 of Fig. 5;

Figure 7 is another detail section at the opposite edge of the holder body portion as upon line 7—7 of Fig. 5; and Figure 8 is a vertical sectional view of the holder body portion as upon line 8—8 of Fig. 5.

Figure 1:
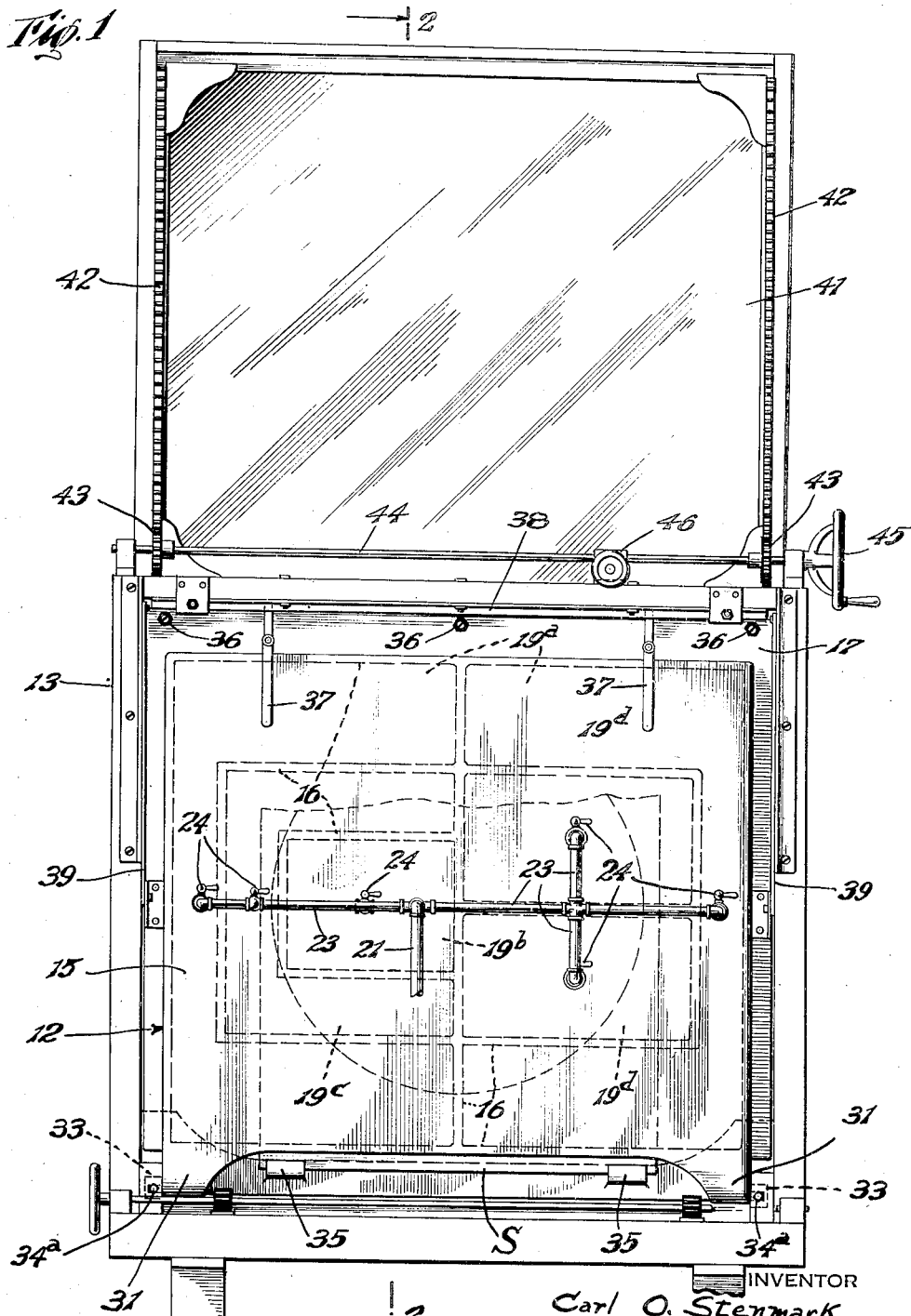
Figure 1 is a rear elevation of my improved holder in position assumed when exposing a film in a camera, and conveniently referred to as the closed position.

In the specific embodiment of the invention illustrated in said drawings, the reference numeral 10 designates a camera in general, the rear or bellows end only of which has been shown, terminating at the rear in the usual frame-like housing 11 with any desired focusing mechanism for moving the housing toward or away from the lens (not shown) at the other end of the bellows. The holder 12 of the present invention is applied at the rear of said housing 11 and will move with the housing during the focusing of the camera.

The holder 12 comprises in general a frame 13 of appropriate size and shape to have marginal fitting contact with the housing for exclusion of any light between the contacting faces, and in usual practice, after the frame is once applied to the rear of housing 11, it will remain thereon for practically all uses to which the camera is subjected. It may be here stated that the invention is one more especially adapted to a camera remaining in a studio or work-shop and of the type in general use by photo-engravers, lithographers, and the like. The use, however, is not limited to these particular instances, as it will be found in practice that this invention has many uses, such as for a scaling camera, including automatic focusing, and other and like purposes. In such use, it is common practice for the rear of the camera to be in a dark-room while the lens and copy holder (not shown) are outside of the dark room. The film 14, comprising a sensitized sheet of gelatine, paper or the like, (see Figs. 6 and 7) therefore does not require any protective enclosure while being inserted into or removed from the camera.

The holder 12 furthermore includes a body portion 15 which, in its closed position, will substantially close the otherwise open area within the frame 13. This body portion is hinged, preferably at its bottom, to the frame, and may be swung rearwardly downward for such purposes as applying a film in position upon the inner face of the body portion, for removing the film, for focusing the camera, for inserting or removing a screen S (Figs. 1 and 2) and for other purposes with which those skilled in the art are familiar or will appreciate from the construction and/or use of the invention.

An essential feature of the invention resides in the construction of this body portion 15 and its adaptation to mounting the film thereupon in proper position and condition. For illustrative purposes, therefore, the body portion is shown as providing a relatively flat casting of aluminum or other suitable metal, the superficies of said casting being substantially that of the body portion itself, and said casting having, on the upper face (that is, the face toward the lens of the camera) a plurality of ribs 16, the forward edges or faces of which are in a common plane. A plate 17, at least co-extensive with and preferably a little larger than the area defined by the outermost of ribs 16, is placed flatwise against the said forward faces of the ribs, being secured thereto as by a plurality of screws 18. Besides circumferential ribs, I have shown one which forms a middle partition between the sides of the casting, others which are spaced inwardly from all four edges of the casting to form an oblong enclosure similar to and centrally disposed with respect to the enclosure formed by the circumferential ribs and symmetrically placed with respect thereto, also other ribs, which, with the middle partition rib form a small-size enclosure next the said middle partition at one side thereof and midway between the top and bottom of the casting, and then another rib at the opposite side of the middle partition midway of its length and dividing that half of the said oblong enclosure crosswise thereof. By virtue of these several ribs and closure plate thereover, the housing provides a plurality of distinct chambers, which (with exponents) are designated by numeral 19. The outer of these chambers are both shown alike, and are designated by numeral 19a and are separated by the middle partition. The small-size innermost chamber is designated by numeral 19b whereas the chamber comprised outside of this small size one 19b and within the outer one 19a is designated by numeral 19c. At the opposite side of the middle partition, the two chambers comprised within the outer chamber and divided from each other by the cross-rib, being shown of sizes and shapes similar to each other are designated by numerals 19d. It is to be understood that other arrangements of ribs and resultant sizes, shapes and positions of chambers may be made. A purpose of the construction shown, however, is to enable films of the size of any one chamber or combination of chambers to be placed and held as nearly central of the holder as practical.

In association with the holder, I provide means for producing a suction effect or vacuum, indicated generally by provision of a vacuum tank 20, from which leads a main pipe 21 having a main control valve 22. Between the position of the main control valve and the several chambers, are a plurality of branch pipes 23, each of which has a control valve 24, and each of which connects at the rear of the holder casting with a different chamber 19 thereof. I am thus enabled to selectively apply the suction effect or vacuum to any single chamber or any desired combination of chambers, and after setting the auxiliary or individual control valves 24, can then manipulate the main control valve 22 for obtaining a single control of the setting.

The plate 17 is provided with a plurality of perforations 25 throughout its area, and any suction effect within a chamber will be communicated through the several perforations registering with that chamber. A film placed upon the forward side of the plate over the area thereof corresponding to the evacuated chamber, will accordingly be held by the suction effect communicated through the perforations mentioned. Suitable indication is made upon the forward side of the plate 17 as to the extent of the underlying chamber so as to enable the operator to properly position the film when less than the whole area of the plate. While the several screws 18 may well serve to thus locate the positions of the chambers, even more definite indication may be employed, such as lines or grooves 26 which overlie the several intermediate ribs 16. In passing, also let it be said that a suitable gasket 27 may be placed between the several ribs and plate 17 for avoiding any leakage of the suction effect from one chamber to another or to the exterior.

Film for the kind of work involved with cameras of the type indicated, is received by the studio in a single standard size, and the plate 17 is preferably made a little larger than such standard size of film so as to receive an entire film sheet when desired. The smaller sizes of film to be placed on the holder are generally cut by the operator for jobs not requiring the entire area of a standard size film. The invention is therefore conducive to the saving of film, and to the use of no more film during any one exposure than required for the particular job. A bottom rail 28 across the face of plate 17 next its lower edge forms an abutment for the support of the lower edge of a standard size film sheet. Side gages 29 are arranged next the side edges of the plate 17 for properly placing the standard sheet with respect to those edges. Inasmuch as the edges of film as received from the factory have a tendency to be wavy, and to eliminate the bad effect of such condition, I deem it advisable to undercut the upper edge of the bottom rail, and to provide hinged cleats 30 at the sides and top of the plate. Said cleats 30 may be swung to flatwise engage the marginal edge of the film to hold it against the plate, and may also be swung away from the fim to release the same and provide proper clearance for removal of the film and insertion of another.

At the lower edge of the casting of the holder body portion 15, next the side edges thereof, are shown hinge extensions 31 from which project oppositely outward on a common axis, hinge pins 32. Each of those pins is received in a rider 33 horizontally slidable in a block 34 fixed with respect to the holder frame 13. An adjusting screw 34a between rider and block enables the casting and plate 17 to be properly positioned with respect to the focal plane. By providing hinge extensions 31 at the bottom of the casting an arch formation is secured and a clearance provided by the arch for rearwardly projecting brackets 35 forming part of the screen support, and thereby permitting the screen to be brought into close proximity to the film in use.

The upper margin of plate 17 is shown projecting above the casting of the body portion. Through this upper margin project adjusting bolts 36 comprising stops for positioning the plate with respect to the focal plane when the holder is swung to closed position. These bolts or stops engage a suitable part of the holder frame, as will be seen in Figures 2 and 3. While three such stops are shown (see Fig. 5) it is to be understood the number or precise placement of the same may be varied in manufacture. The said upper margin of plate 17 also provides suitable area for mounting appropriate locking hasps 37. These hasps may be swung sidewise and provide each an upper lip to enter forward of a shoulder provided for the purpose. Such shoulder in the present showing is constituted by a depending component of an angle-bar 38. That bar is adjustably mounted on the under side of the top rail of the holder frame and by virtue of the adjustment the clamping of the hasps may be made effective notwithstanding varying positions of the plate 17 resulting from its adjustment heretofore described.

It has been definitely indicated above that the holder body portion may be swung upon the axis of its hinge pins 32 to an upright closed position or to a backwardly reclining open position (shown in dotted lines in Fig. 2). Limitation of the open position may be effected in suitable manner, and by way of illustration there are provided a pair of stays 39, one at each side of the holder, pivoted midway of the holder and having their upper ends movable vertically by virtue of pins or bolts thereon projecting into vertical slots 40. When the pin reaches the bottom of the slot, the holder can open no further, and it is preferable that such limitation be effective before the holder arrives at a horizontal position. Thus a film placed upon the holder will have no tendency to retract from the cleat at the bottom of the plate.

The holder also includes a focusing glass 41 having a supporting frame or casement 42 around the glass. It will of course be understood that the term "glass" is used in this connection to indicate any translucent material suitable for the purpose, but that where glass is used, the same is preferably ground glass such as ordinarily used for focusing purposes in cameras. The casement of the focusing "glass" is vertically slidable in grooves provided for the purpose in the side rails of the holder frame 13, and properly proportioned and positioned to retain the "glass" always in upright position and in the focal plane. This "glass" is slidable upwardly out of the way after the focusing is complete so as to permit the holder body portion to be then swung up to closed position. When the body portion is thus closed, the film placed thereon will occupy a position in the precise plane of the raised "glass" and thus the focus secured upon the "glass" will be as sharp and distinct upon the film. Raising and lowering of the glass may be effected by utilization of a pair of racks 42 upon one face of the casement operated by a corresponding pair of pinions 43 meshing therewith and in turn mounted upon a cross-shaft 44 at the top of the holder frame. A suitable hand-wheel or crank 45 is shown at the end of this cross-shaft for rotating the same, and a convenient brake or clamp 46 is provided upon the top of said frame for gripping the shaft and retaining the "glass" in its elevated position until needed again for focusing purposes. It will be understood that before lowering the "glass" it is necessary to first swing the holder body portion rearwardly out of the way.

It must be borne in mind that in the foregoing description, the use of the word "film" is in its broad sense to include any sensitized sheet material, inclusive of the generally employed gelatine, composition, paper, and other sheets. In this connection specific mention may be made of the advantages of the present invention for holding of sensitized paper sheets or films, which are even more susceptible to climatic variations than gelatine films, for in dry weather they curl very positively at times into a roll when not held and in damp weather they crinkle to a serious extent. In either event, the cleats 30 and bottom rail 28 serve to hold the edges thereof against the plate 17, and thus makes the vacuum effective throughout the entire area of the film, both because the film is held in close proximity to the several perforations and because there is minimum opportunity for entry of air under the edge of the film to counter-act the effectiveness of the vacuum.

Obviously, for purposes of illustrating the invention, one specific construction has to be selected, and while the showing is made of parts deemed at this time as preferable, yet many equivalents might as well have been chosen, and it is therefore to be understood that many modifications and changes may be made in the actual choice, construction and assembly of parts, and the illustrations and accompanying description thereof are presented for the purpose of a broad disclosure and are not to be taken in a restrictive sense except as specifically limited by the following claims when construed in the light of the prior art.

Having thus described the invention, I claim:—

1. A holder for films and the like, comprising a frame, a hollow body portion having a flat forward surface and said surface having a plurality of perforations communicating with the hollow interior of the body portion, means for applying a vacuum effect within said body portion and communicating the same through said perforations to a film or the like upon said surface, said body portion being hinged in said frame to close and position said surface in a definite plane with respect to said frame, said holder having a movable focusing glass and said glass being in said plane and position of the said surface when focusing and the body portion being then swung out of that position.

2. A holder for films and the like, comprising a hollow body portion having a flat forward surface and said surface having a plurality of perforations communicating with the hollow interior of the body portion, means for applying a vacuum effect within said body portion and communicating the same through said perforations to a film or the like upon said surface, a slidable focusing glass, and means for hingedly mounting said body portion, thereby enabling the body portion to be swung out of the way and the focusing glass to be slid into focusing position.

3. A holder for films and the like, comprising a hollow body portion having a flat forward surface and said surface having a plurality of perforations communicating with the hollow interior of the body portion, means for applying a vacuum effect within said body portion and communicating the same through said perforations to a film or the like upon said surface, a focusing glass, means for hingedly mounting said body portion, thereby enabling the body portion to be swung out of the way and be replaced by the focusing glass, and adjusting means for placing the said surface in the precise position of the focusing glass when the body portion is swung to closed position.

4. A holder for films and the like, comprising a hollow body portion having a flat forward surface and said surface having a plurality of perforations communicating with the hollow interior of the body portion, means for applying a vacuum effect within said body portion and communicating the same through said perforations to a film or the like upon said surface, an adjustable hinged mounting for the said body portion and adjustable stops for said body portion for positioning the said surface of the body portion in a desired focal plane.

5. In combination with a camera, a vacuum holder having a perforate surface plate for retention of a film or the like by vacuum effect, and means hinged at each of a plurality of the edges of said plate for retaining edges of the film.

CARL O. STENMARK.